UNITED STATES PATENT OFFICE.

SAMUEL DOUBLEDAY, OF BALTIMORE, MARYLAND.

IMPROVEMENT IN BRONZE ALLOYS.

Specification forming part of Letters Patent No. 160,885, dated March 16, 1875; application filed October 29, 1873.

*To all whom it may concern:*

Be it known that I, SAMUEL DOUBLEDAY, of Baltimore, in the county of Baltimore and State of Maryland, have invented a new and useful Improvement in Bronze Alloy; and I do hereby declare the following to be a full, clear, and exact description of the same.

My invention consists in a composition of substances in about the proportions set forth in the following formula, the particular and distinguishing qualities of the said composition being compactness, hardness, and sonorousness. It is designed for use in journal-bearings, bells, &c.

I take of copper, twenty parts; glass, five parts; antimony, one and one-half parts; tin, one-half part; spelter, one part; lead, one part.

These ingredients are fused together in a crucible in the ordinary manner of making brass or bronze alloys, the copper being fused and the remaining materials added. I prepare the glass by breaking it into fragments of a size about equal to that of grains of corn.

It is found advantageous to use a flux in the melting-pots, and oyster-shells and charcoal have been employed for that purpose.

I claim as my invention—

A composition for bronze, consisting of copper, glass, antimony, tin, spelter, and lead, in the proportions herein described.

SAML. DOUBLEDAY.

Witnesses:
R. D. O. SMITH,
NOAH SMITH.